United States Patent
Singh et al.

(10) Patent No.: US 11,093,991 B2
(45) Date of Patent: Aug. 17, 2021

(54) VEHICLE PURCHASING TOOLS

(71) Applicant: CAPITAL ONE SERVICES, LLC, McLean, VA (US)

(72) Inventors: Gurmeet Singh, Irving, TX (US); Warren Ellison, Keller, TX (US); Patrick Eberle, Frisco, TX (US); Adam Zedler, San Francisco, CA (US); Kurt Wolf, Frisco, TX (US); Raman Bajaj, Frisco, TX (US); Jason Hoover, Grapevine, TX (US)

(73) Assignee: CAPITAL ONE SERVICES. LLC, McLean, VA (US)

( * ) Notice: Subject to any disclaimer, the term of this patent is extended or adjusted under 35 U.S.C. 154(b) by 0 days.

(21) Appl. No.: 16/893,712

(22) Filed: Jun. 5, 2020

(65) Prior Publication Data

US 2020/0302503 A1 Sep. 24, 2020

Related U.S. Application Data

(63) Continuation of application No. 15/911,486, filed on Mar. 5, 2018, now Pat. No. 10,679,271, which is a (Continued)

(51) Int. Cl.
*G06Q 30/00* (2012.01)
*G06Q 30/06* (2012.01)
*G06Q 40/02* (2012.01)

(52) U.S. Cl.
CPC ....... *G06Q 30/0623* (2013.01); *G06Q 40/025* (2013.01)

(58) Field of Classification Search
CPC .................. G06Q 40/025; G06Q 30/0623
(Continued)

(56) References Cited

U.S. PATENT DOCUMENTS 7,529,694 B2 5/2009 Crites
9,607,336 B1 3/2017 Dean et al.
(Continued)

OTHER PUBLICATIONS

Sawyers, Arlena: Jump-starting car sales from the service lane: Tool offers financing, suggests vehicles Automotive News 89.6663: 34, Mar. 9, 2015; Dialog #1662468461, 4 pgs. (Year: 2015).

*Primary Examiner* — Robert M Pond
(74) *Attorney, Agent, or Firm* — Finnegan, Henderson, Farabow, Garrett & Dunner LLP

(57) ABSTRACT

A system for providing a vehicle purchasing tool is disclosed. The system may include one or more memory devices storing software instructions. The system may also include one or more processors configured to execute the software instructions to receive a pre-qualification application, the pre-qualification application including customer-identifying information, access a vehicle inventory associated with a dealership, and identify vehicle information associated with at least one vehicle for sale at the dealership based on the pre-qualification application. The one or more processors may be further configured to execute the instructions to determine a pre-qualified offer based at least on the customer-identifying information and the vehicle information, the pre-qualified offer including a first loan term, and provide the pre-qualified offer and the vehicle information to a client device for display as part of the pre-qualified offer in conjunction with the vehicle information.

20 Claims, 10 Drawing Sheets

Related U.S. Application Data continuation of application No. 15/143,456, filed on Apr. 29, 2016, now abandoned.

(60) Provisional application No. 62/155,209, filed on Apr. 30, 2015.

(58) Field of Classification Search
USPC .................................................. 705/26, 27
See application file for complete search history.

(56) References Cited

U.S. PATENT DOCUMENTS

| | | |
|---|---|---|
| 10,163,156 B1 | 12/2018 | Shapley et al. |
| 2004/0064402 A1 | 4/2004 | Dreyer |
| 2007/0244808 A1 | 10/2007 | Eze |
| 2009/0043690 A1* | 2/2009 | MacLellan ............ G06Q 40/02 705/38 |
| 2010/0082451 A1* | 4/2010 | Bryson .............. G06Q 30/0601 705/26.1 |
| 2011/0270659 A1 | 11/2011 | Crites |
| 2012/0230548 A1 | 9/2012 | Calman et al. |
| 2014/0270275 A1 | 9/2014 | Burgiss |
| 2015/0120489 A1 | 4/2015 | Edelman |

* cited by examiner

VEHICLE PURCHASING TOOLS

This application is a continuation of U.S. patent application Ser. No. 15/911,486, filed Mar. 5, 2018, which claims the benefit of priority to U.S. patent application Ser. No. 15/143,456, filed Apr. 29, 2016, which claims priority under 35 U.S.C. § 119 to U.S. Provisional Application No. 62/155,209, filed on Apr. 30, 2015, and entitled "Vehicle Purchasing Tools. The disclosures of the above-referenced applications are expressly incorporated herein by reference in their entireties.

TECHNICAL FIELD

Technical Field

The disclosed embodiments generally relate to vehicle purchasing tools, and more particularly, to systems and methods for providing pre-qualified vehicle financing offers in association with vehicle inventory listings.

Background

Current vehicle purchasing tools provide little in the way of convenience for the customer. A potential car-buyer that is financing at least a part of the purchase must go through separate steps of finding a vehicle that they would like to purchase and obtaining the details of the financing for which they are eligible. Customers often visit a vehicle dealership without knowing the details of potential financing and select a car they wish to purchase, only to find out that the available financing terms do not suit their needs. This draws out the car-buying process and puts customers on-the-spot for either accepting financing terms that they do not prefer or repeating the long process of attempting to find another vehicle that they would be willing to purchase.

In some instances, a customer may request a financing quote to determine the structure of a potential financing offer prior to selecting a car for purchase or visiting a vehicle dealership. This option also has drawbacks, however, because the potential financing may not be accurate unless a financial institution officially requests credit history information for the customer and makes a determination regarding potential financing offers. Such an inquiry will be added to the customer's credit history reports and may negatively affect the customer's credit scores.

Further, because customers are forced to separately identify the vehicle they wish to purchase (e.g., at a dealership, dealership website, or third-party vehicle sales website) and potential financing offers for the vehicle (e.g., by filling out a loan application online or at a dealership after selecting a vehicle), there is a lack of convenience for the customer when browsing vehicles to potentially purchase. While some sources may provide a customer with a financing estimate for a selected vehicle, the customer cannot rely on the estimate because the entity that provides the estimate is not bound by the potential terms proposed, and because the estimate itself is unlikely to be accurate without the customer filling out a loan application.

Thus, there is a need for more convenient vehicle purchasing tools that provide customers with vehicle financing options that can be used in conjunction with selecting a vehicle to purchase, without the risk of negatively affecting the customer's credit scores.

SUMMARY

The disclosed embodiments include systems and methods for providing pre-qualified offers that reflect financing offers that may be accepted by a customer upon presentation in conjunction with vehicle inventory listings.

In one aspect, the present disclosure is directed to a system for providing a vehicle purchasing tool. The system may include one or more memory devices storing software instructions. The system may also include one or more processors configured to execute the software instructions to receive a pre-qualification application, the pre-qualification application including customer-identifying information. The one or more processors may be further configured to execute the software instructions to access a vehicle inventory associated with a dealership and identify vehicle information associated with at least one vehicle for sale at the dealership based on the pre-qualification application. The one or more processors may be further configured to execute the instructions to determine a pre-qualified offer based at least on the customer-identifying information and the vehicle information, the pre-qualified offer including a first loan term, and provide the pre-qualified offer and the vehicle information to a client device for display as part of the pre-qualified offer in conjunction with the vehicle information.

In another aspect, the present disclosure is directed to a method for providing a vehicle purchasing tool. The method may include receiving a pre-qualification application, the pre-qualification application including customer-identifying information. The method may further include accessing a vehicle inventory associated with a dealership and identifying vehicle information associated with at least one vehicle for sale at the dealership based on the pre-qualification application. The method may further include determining a pre-qualified offer based at least on the customer-identifying information and the vehicle information, the pre-qualified offer including a first loan term, and providing the pre-qualified offer and the vehicle information to a client device for display as part of the pre-qualified offer in conjunction with the vehicle information.

Consistent with another disclosed embodiment, a tangible computer-readable medium storing instructions for providing a vehicle purchasing tool is provided. The instructions may be operable to cause one or more processors to perform operations consistent with the method described above.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION

Figure 1:
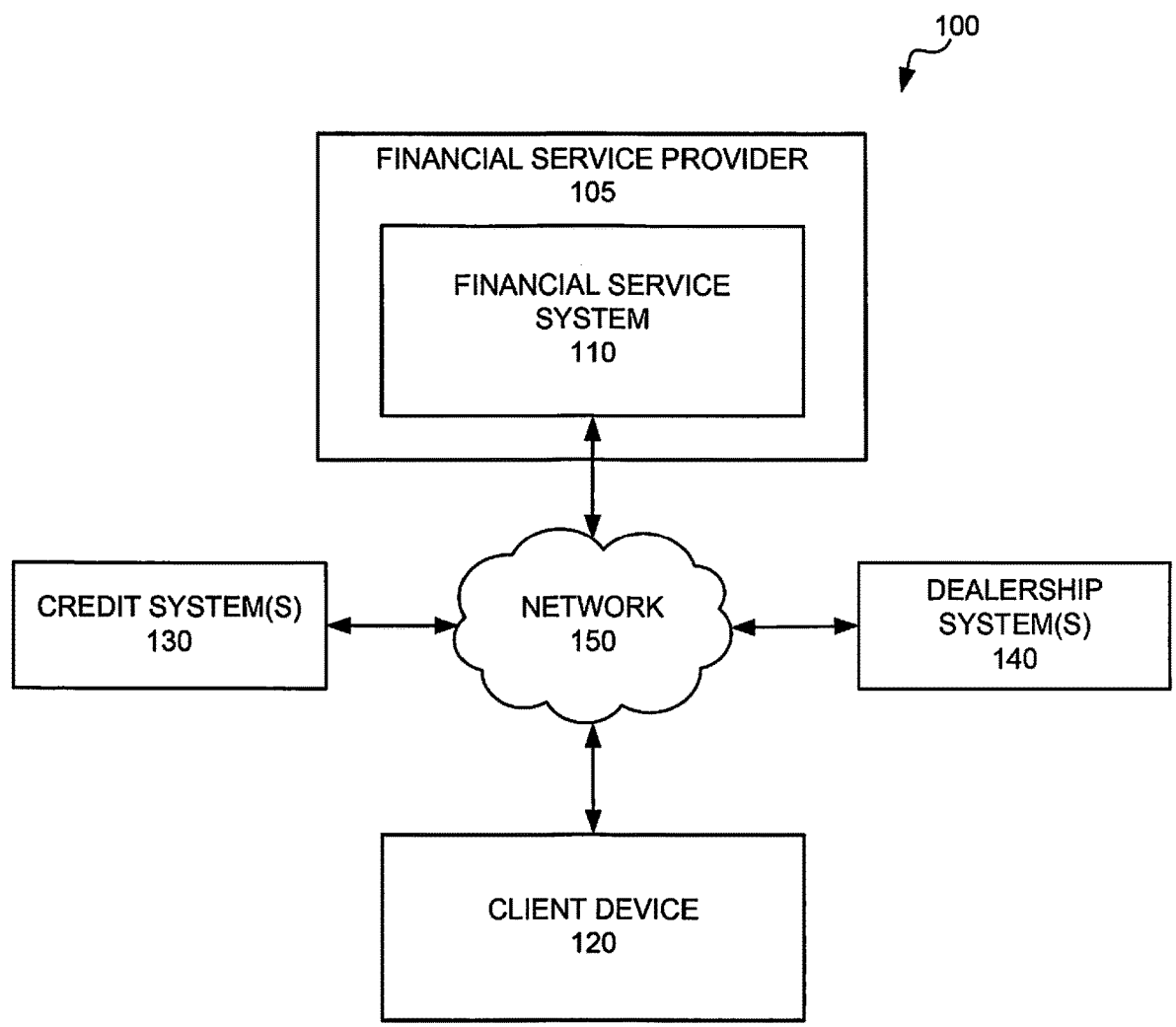
FIG. 1 is a block diagram of an exemplary system, consistent with disclosed embodiments.

Reference will now be made in detail to the disclosed embodiments, examples of which are illustrated in the accompanying drawings. Wherever convenient, the same reference numbers will be used throughout the drawings to refer to the same or like parts.

The disclosed embodiments include systems and methods for providing vehicle purchasing tools for finding and financing a vehicle. For example, disclosed embodiments pertain to vehicle financing offers, as well as informational tools easily and efficiently obtain any information that may be helpful in making decisions regarding the purchase.

In some aspects, the disclosed embodiments include systems and methods for determining whether a customer is pre-qualified for financing and, if so, determining one or more pre-qualified offers to provide to the customer. The pre-qualified offers may represent improved system processing techniques that provide several advantages to the parties involved in the purchase of a vehicle. For example, improved system processing techniques may allow pre-qualified offers in such a way that minimizes or eliminates a risk that the customer's credit scores will be negatively affected by credit inquiries regarding the financing, while also presenting and maintaining the pre-qualified offer as a binding offer on which the customer can rely. In this way, the pre-qualified offers may be employed as purchasing tools for narrowing a search for a vehicle to purchase, including narrowing the selection of on-sale vehicles to buy (e.g., based on the parameters of a pre-qualified offer).

In some aspects, the disclosed embodiments pertain to a comprehensive vehicle buying tool that provides the ability to view and search vehicles for sale, in conjunction with financing information. For example, exemplary disclosed systems may include technical features that provide user interfaces that include vehicle information related to the vehicles for sale, in addition to pre-qualified loan offers that relate to specific vehicles and are binding offers that the customer may rely on to purchase a selected vehicle from the listed vehicles.

While the disclosed embodiments are described in relation to systems and method for purchasing vehicles, it should be understood that certain features of the disclosed embodiments may be equally applicable to other fields of use. For example, the disclosed embodiments may apply to tools for purchasing other products and/or items for sale. For example, disclosed systems and methods may be adapted to provide customers with tools for receiving pre-qualified mortgage offers in relation to houses or other property for sale and for using those offers to select a house or other property to buy. Further, it should be understood that the disclosed embodiments are not limited to the purchase of vehicles of other products, and may related to other transactions, such as a vehicle lease. Indeed, one of ordinary skill in the art will understand that disclosed embodiments are not limited to any particular industry or purchasing mechanism.

Disclosed embodiments may be implemented in various environments. Such environments and related applications may be specifically constructed for performing the various processes and operations of the disclosed embodiments and may include one or more specialized apparatuses or systems configured to execute software programs that perform processes consistent with the disclosed embodiments. The apparatus(es) or system(s) may be specifically constructed with hardware and/or software components that provide the functionality and advantages of the disclosed embodiments.

The disclosed embodiments also relate to tangible and non-transitory computer readable media that include program instructions or program code that, when executed by one or more processors, perform one or more computer-implemented operations. The program instructions or program code may include specially designed and constructed instructions or code for achieving one or more aspects of the disclosed embodiments.

FIG. 1 shows an exemplary system 100 that may be configured to perform one or more software processes that, when executed, provide one or more aspects of the disclosed embodiments. The components and arrangement shown in FIG. 1 is not intended to be limiting to the disclosed embodiment as the components used to implement the processes and features disclosed here may vary.

In accordance with certain disclosed embodiments, system 100 may include a financial service provider 105, a financial service system 110, a client device 120, one or more credit systems 130, one or more dealership systems 140, and a network 150. Other components known to one of ordinary skill in the art may be included in system 100 to process, transmit, provide, and/or receive information consistent with the disclosed embodiments.

Financial service provider 105 may be one or more entities that configure, offer, provide, and/or manage financial service accounts, such as credit card accounts, debit card accounts, checking or savings accounts, loyalty accounts, and/or loan accounts. In one aspect, financial service provider 105 may include or be associated with financial service system 110, which may be configured to perform one or more aspects of the disclosed embodiments. In some embodiments, financial service system 110 may be configured with technical features that allow financial service system 110 to process information in a manner that provides the advantages of the disclosed embodiments.

Financial service system 110 may be one or more systems associated with one or more entities, such as financial service provider 105, that configures, offers, provides, and/or manages financial service accounts, such as credit card accounts, debit card accounts, checking or savings accounts, and loan accounts. Consistent with the disclosure, financial service system 110 may provide a loan account for financing a purchase of one or more users (i.e., customers). In some embodiments, the loan account may be a vehicle loan account.

Financial service system 110 may be configured to provide one or more loan application tools. For example, the loan application tool may allow financial service system 110 to provide a loan application, receive a completed loan application, assess the income, creditworthiness, risk, etc. associated with a customer (through communication with credit system(s) 130, for example), identify one or more financing offers based on those assessments, and provide (via, e.g., an API) those financing offers to another component of system 100, such as client device 120 or a dealership system 140. In an exemplary embodiment, the loan application tools may include a pre-qualification tool that allows a user to submit a pre-qualification application and financial service system 110 to determine one or more pre-qualified offers based on the information in the pre-qualification application and/or other available information.

In some embodiments, financial service system 110 may also include vehicle inventory information. For example, financial service system 110 may maintain a list of vehicles and information associated with those vehicles. For instance, financial service system 110 may store an inventory list associated with an automobile dealership, the inventory list including a list of specific vehicles that the automobile dealership possesses for sale, and information associated with each vehicle (e.g., vehicle make, model, year, mileage, features, retail price, estimated value, expected depreciation, etc.). In some embodiments, the list of vehicles may include any vehicle for sale, whether or not the vehicle is associated with an automobile dealership. For example, used vehicles for sale by the owner of the vehicle may be included. Financial service system 110 may monitor automobile dealership inventory turnover and other vehicle listing and purchasing activity and update the list accordingly, such as to maintain an up-to-date list of vehicles.

In some embodiments, financial service system 110 may include components or features that allow for the integration of vehicle purchasing tools with the listing of vehicles. For example, financial service system 110 may be configured to integrate third-party information and services with the listing of vehicles, such as user reviews of vehicles and/or auto dealerships, vehicle history reports (e.g., CarFax® reports), estimated vehicle values (e.g., Kelley Blue Book™ values), tools associated with trade-in vehicles (e.g., value calculators, third-party purchasers, for sale listing services, etc.), and the like.

Financial service system 110 may include one or more components that perform processes consistent with the disclosed embodiments. For example, financial service system 110 may include one or more computers (e.g., servers, database systems, etc.) configured to execute software instructions programmed to perform aspects of the disclosed embodiments, such as generating financial service accounts, maintaining accounts, processing financing requests and/or any other information relating to accounts, etc. For example, financial service system 110 may be configured to execute stored software instructions to perform processes related to determining and providing pre-qualified offers, generating and providing interactive user interfaces that include pre-qualified offers and/or for sale vehicle listings, and processing financing agreements associated with accepted offers.

Consistent with disclosed embodiments, financial service system 110 may include other components and infrastructure that enable it to perform operations, processes, and services consistent with disclosed embodiments. In addition, financial service system 110 may be configured to communicate with other components of system 100 in order to provide one or more of the features described herein.

Client device 120 may be one or more computing devices that are configured to execute software instructions for performing one or more operations consistent with the disclosed embodiments. Client device 120 may be a desktop computer, a laptop, a server, a mobile device (e.g., tablet, smart phone, etc.), embedded system, dedicated hardware system, etc. Client device 120 may include interface hardware (e.g., a display device) included in, or connected to, client device 120 for displaying user interfaces generated by and/or received from a component of system 100.

Client device 120 may include one or more processors configured to execute software instructions stored in memory, such as memory included in client device 120. Client device 120 may include software that when executed by one or more processors performs known Internet-related communications and content display processes. For instance, client device 120 may execute browser software that generates and displays user interfaces including content on interface hardware included in, or connected to, client device 120.

In some embodiments, client device 120 may be a mobile device that stores and executes mobile applications ("apps") that provide financial service related functions offered by financial service provider 105, such as a mobile banking app for controlling, configuring, and viewing information relating to financial accounts, etc., and/or a vehicle financing app that provides one or more of the vehicle purchasing tools disclosed herein.

Credit system(s) 130 may be one or more computer systems associated with a third-party credit reporting entity. For example, credit system(s) 130 may be individually associated with existing credit bureaus (e.g., Trans Union®, Experian®, Equifax®) that maintain credit information (e.g., credit reports, credit scores, etc.) in association with individuals (e.g., information identifying particular individuals).

Credit system(s) 130 may include one or more computing systems that are configured to perform computer-implemented processes, such as a server, desktop computer, laptop, mobile device with computing ability, etc. In an exemplary embodiment, credit system(s) 130 may be configured to provide information and/or services related to the assessment of risk and/or creditworthiness of prospective vehicle purchase customers. For example, credit system(s) 130 may be configured to receive credit report inquiries, identify requested credit information, and provide credit report information to another component of system 100 (e.g., financial service system 110).

In some embodiments, credit system(s) 130 may be configured to differentiate between a "soft" credit inquiry and a "hard" credit inquiry. For example, credit system(s) 130 may be configured to determine that a credit inquiry is for pre-qualification purposes, and thus, is a "soft" credit inquiry. Similarly, credit system(s) 130 may be configured to determine that a credit inquiry is related to an application for a binding financing agreement, and thus, is a "hard" credit inquiry. For the purposes of this disclosure, a "soft" credit inquiry may be a credit inquiry that is not added to an associated individual's credit history, is not considered when calculating an individual's credit scores, and/or otherwise does not of itself substantively affect an individual's risk profile and/or creditworthiness. A "hard" credit inquiry may be a credit inquiry that could have an effect on an individual's credit reports, credit scores, risk profile, creditworthiness, etc.

Dealership system(s) 140 may be respectively associated with one or more entities associated with the selling of a vehicle. For example, a dealership system 140 may be associated with an automobile dealership. In other embodiments, dealership system(s) 140 may be a non-automobile dealership otherwise associated with the financing of a vehicle purchase (e.g., a third-party sales broker, auction entity, individual seller, etc.).

Dealership system(s) 140 may be one or more computer systems that are configured to perform computer-implemented processes. For example, dealership system(s) 140 may include a server, desktop computer, laptop, mobile device with computing ability (e.g., smart phone, tablet, etc.), or any combination of these computers and/or affiliated components. In one embodiment, a dealership system 140 may be a computing device that is operated by an employee of an automobile dealership to provide, assess, and/or modify financing options for a customer or prospective customer. In an exemplary embodiment, dealership system(s) 140 may be configured to provide information and/or services related to the vehicle purchase agreement and/or accepted financing offer. For example, dealership system(s) may be configured to provide loan applications to financial service system 110 and complete vehicle purchase transactions.

Network 150 may be any type of network that facilitates communications and data transfer between components of system 100, such as, for example, financial service system 110, client device 120, credit system(s) 130, and dealership system(s) 140. Network 150 may be a Local Area Network (LAN), a Wide Area Network (WAN), such as the Internet, and may be a single network or a combination of networks. Further, network 150 may reflect a single type of network or a combination of different types of networks, such as the Internet and public exchange networks for wireline and/or wireless communications. Network 150 may utilize cloud computing technologies that are familiar in the marketplace. Network 150 is not limited to the above examples and system 100 may implement any type of network that allows the entities (shown and not shown) included in FIG. 1 to exchange data and information.

Although FIG. 1 depicts a certain number of entities and processing/computing components within system 100, any number or combination of components may be implemented without departing from the scope of the disclosed embodiments. For example, financial service system 110 may interact with users described as associated with client device 120 through other components of system 100, such as a dealership system 140. Additionally, it should be understood that the components of system 100 are not mutually exclusive. For example, in one disclosed embodiment, financial service system 110 and credit system 130 may be associated with the same entity or partnered with one another. The entities as described are not limited to their discrete descriptions above. Further, where different components of system 100 are combined (e.g., financial service system 110 and credit system 130, etc.), the computing and processing devices and software executed by these components may be integrated into a local or distributed system.

Figure 2:
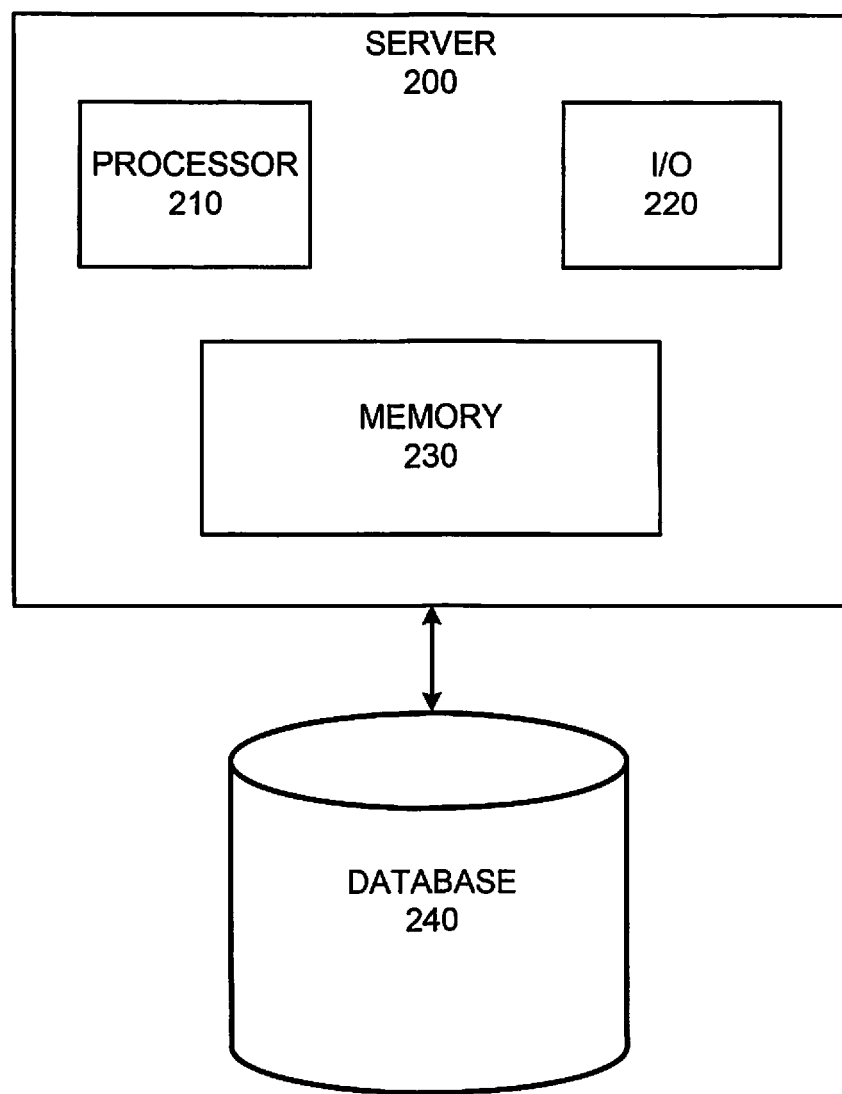
FIG. 2 is a block diagram of an exemplary server, consistent with disclosed embodiments.

FIG. 2 depicts a server 200, consistent with disclosed embodiments. In an exemplary embodiment, financial service system 110 may include server 200. It should be understood, however, that although server 200 may be depicted and described herein as a component of financial service system 110 for ease of discussion, a server 200 or variations thereof may be used alternatively or additionally by client device 120, credit system(s) 130, dealership system(s) 140 and/or other components of system 100 (shown and not shown) to perform processes consistent with disclosed embodiments.

In one embodiment, server 200 may include one or more processors 210, one or more input/output (I/O) devices 220, and one or more memories 230. According to some embodiments, server 200 may comprise web server(s) or similar computing devices that generate, maintain, and provide web site(s) consistent with disclosed embodiments. Server 200 may be standalone, or it may be part of a subsystem, which may be part of a larger system. For example, server 200 may represent distributed servers that are remotely located and communicate over a network (e.g., network 150) or a dedicated network, such as a LAN.

Processor 210 may include one or more known processing devices, such as a microprocessor from the Pentium™ or Xeon™ family manufactured by Intel™, the Turion™ family manufactured by AMD™, or any of various processors manufactured by Sun Microsystems. The disclosed embodiments are not limited to any type of processor(s) configured in server 200.

I/O devices 220 may be one or more devices configured to allow data to be received and/or transmitted by server 200. I/O devices 220 may include one or more user I/O devices and/or components, such as those associated with a keyboard, mouse, touchscreen, display, etc. I/O devices 220 may also include one or more digital and/or analog communication devices that allow server 200 to communicate with other machines and devices, such as other components of system 100. I/O devices 220 may also include interface hardware configured to receive input information and/or display or otherwise provide output information. For example, I/O devices 220 may include a monitor configured to display a user interface.

Memory 230 may include one or more storage devices configured to store instructions used by processor 210 to perform functions related to disclosed embodiments. For example, memory 230 may be configured with one or more software instructions associated with programs and/or data. Memory 230 may include a single program that performs the functions of the server 200, or multiple programs. Additionally, processor 210 may execute one or more programs located remotely from server 200. For example, financial service system 110, device 120, credit system(s) 130, and/or dealership system(s) 140, may, via server 200, access one or more remote programs that, when executed, perform functions related to disclosed embodiments. Memory 230 may also store data that may reflect any type of information in any format that the system may use to perform operations consistent with the disclosed embodiments.

Server 200 may also be communicatively connected to one or more database(s) 240. For example, server 200 may be communicatively connected to database(s) 240 through network 150. Database 240 may include one or more memory devices that store information and are accessed and/or managed through server 200. By way of example, database(s) 240 may include Oracle™ databases, Sybase™ databases, or other relational databases or non-relational databases, such as Hadoop sequence files, HBase, or Cassandra. The databases or other files may include, for example, data and information related to the source and destination of a network request, the data contained in the request, etc. Systems and methods of disclosed embodiments, however, are not limited to separate databases. In one aspect, server 200 may include database 240. Alternatively, database 240 may be located remotely from the server 200. Database 240 may include computing components (e.g., database management system, database server, etc.) configured to receive and process requests for data stored in memory devices of database(s) 240 and to provide data from database 240.

Figure 3:
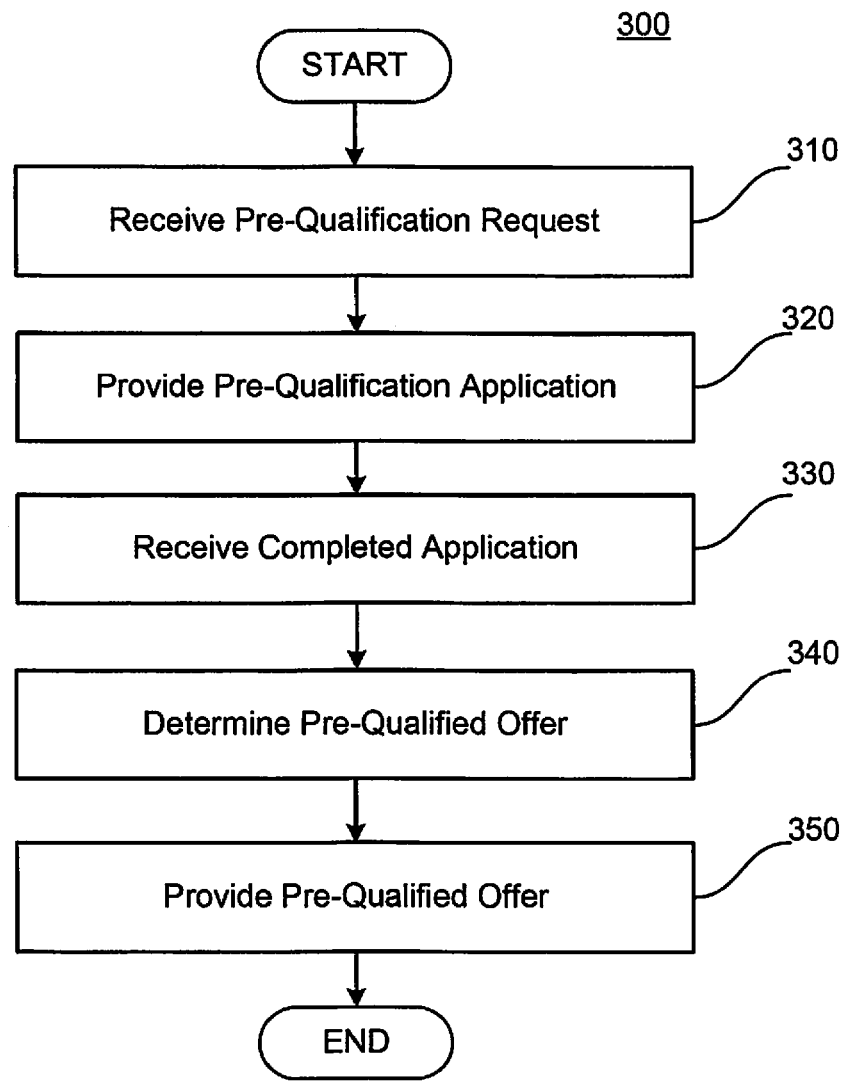
FIG. 3 is a flowchart of an exemplary pre-qualified offer application process, consistent with disclosed embodiments.

FIG. 3 is a flowchart of an exemplary pre-qualified offer application process 300, consistent with disclosed embodiments. In one embodiment, financial service system 110 may perform one or more of the steps of process 300 to provide a pre-qualified offer tool to client device 120. Through the pre-qualified offer tool, financial service system 110 may provide client device 120 with one or more pre-qualified offers for the financing of a vehicle purchase.

In step 310, financial service system 110 may receive a pre-qualification request. Financial service system 110 may receive the pre-qualification request from client device 110. The pre-qualification application request may include any information that initiates a pre-qualification process. In one example, financial service system 110 may provide an advertisement or notice to client device 120, which client device 120 may display (e.g., via a web browser, mobile app, etc.). The advertisement or notice may describe the pre-qualification process. Client device 120 may receive input (e.g., from a user) indicating that the user wants to initiate the pre-qualification process. Client device 120 may create a corresponding pre-qualification request and send the request to financial service system 110.

In step 320, financial service system 110 may provide a pre-qualification application. For example, financial service system 110 may provide a pre-qualification application to client device 120. Client device 120 may display the pre-qualification application using interface hardware. The pre-qualification may include, for example, a fillable form with one or more prompts for requested information. The requested information may include information identifying a customer that is seeking pre-qualification. For example, the requested information may include at least customer name and address, and may also include other identifying information, such as social security number, driver's license number, phone number, etc. In some embodiments, the requested information may include information identifying a financial account held by the customer and maintained by, for example, financial service provider 105. For example, the requested information may include an account number, card number, pin number, etc., which may allow financial service system 110 to identify a corresponding financial account and determine customer-identifying information (e.g., based on information associated with the corresponding financial account).

In step 330, financial service system 110 may receive a completed pre-qualification application. Financial service system 110 may receive the completed pre-qualification application from client device 120. In one example, the customer may provide input to client device 120, the input including the requested information. In other words, the customer may fill out the pre-qualification application using client device 120. Client device 120 may send the completed pre-qualification application to financial service system 110.

In step 340, financial service system 110 may determine one or more pre-qualified offers. Financial service system 110 may determine the one or more pre-qualified offers based on the requested information from the completed pre-qualification application. In one example, the one or more pre-qualification offers may include at least a structure of a loan offer for the customer to finance a purchase of a vehicle. For example, a pre-qualification offer may include a maximum amount for the loan (e.g., up to $25,000, up to $40,000, etc.) and an interest rate or range of interest rates for the loan (e.g., 3.00-4.00% APR, 3.25-3.75%, etc.). In other examples, a pre-qualification offer may include additional details regarding the loan offer (e.g., length of loan term, monthly payments, minimum down payment amount, trade-in value, etc.). Financial service system 110 may use a credit policy and pricing program to determine the pre-qualified offer(s). For example, financial service system 110 may use credit information and one or more risk assessment tools to determine acceptable terms of a loan for the customer.

In an exemplary embodiment, a pre-qualified offer may be an offer for a loan that reflects the willingness of financial service provider 105 to provide the loan, should the terms of the pre-qualified offer be accepted by the customer. Consistent with disclosed embodiments, however, the loan offer may be pre-qualified in that the customer has not actually applied for a loan and has only inquired into such a loan. In this way, the customer's inquiry will not negatively affect the customer's credit history reports and scores. Credit reporting practices are typically such that applications for a binding loan agreement can be added to credit reports and considered in credit scores, while inquiries for pre-qualification are not. In order to allow the customer to rely on the pre-qualified offer, however, financial service system 110 may be configured to honor the terms of the pre-qualified offer should the customer accept the terms and submit a completed loan application.

In step 350, financial service system 110 may provide the determined pre-qualified offer. For example, financial service system 110 may provide the determined pre-qualified offer to client device 120. Client device 120 may display the pre-qualified offer using interface hardware. A customer may review the pre-qualified offer (and any other pre-qualified offers) and use the information in the process of selecting a vehicle to purchase. For example, the customer may use the terms of the pre-qualified offer as a guide for selecting a vehicle within a price-range of the offer. In this way, the customer can select a vehicle and negotiate a price for the purchase of the vehicle, with prior knowledge of the financing terms that are available.

It should be understood that, in some instances, financial service system 110 may determine that the customer is not eligible for any pre-qualified offers. In these situations, financial service system 110 may provide information to client device 120 indicating that the customer is not approved for a pre-qualified offer.

Figure 4:
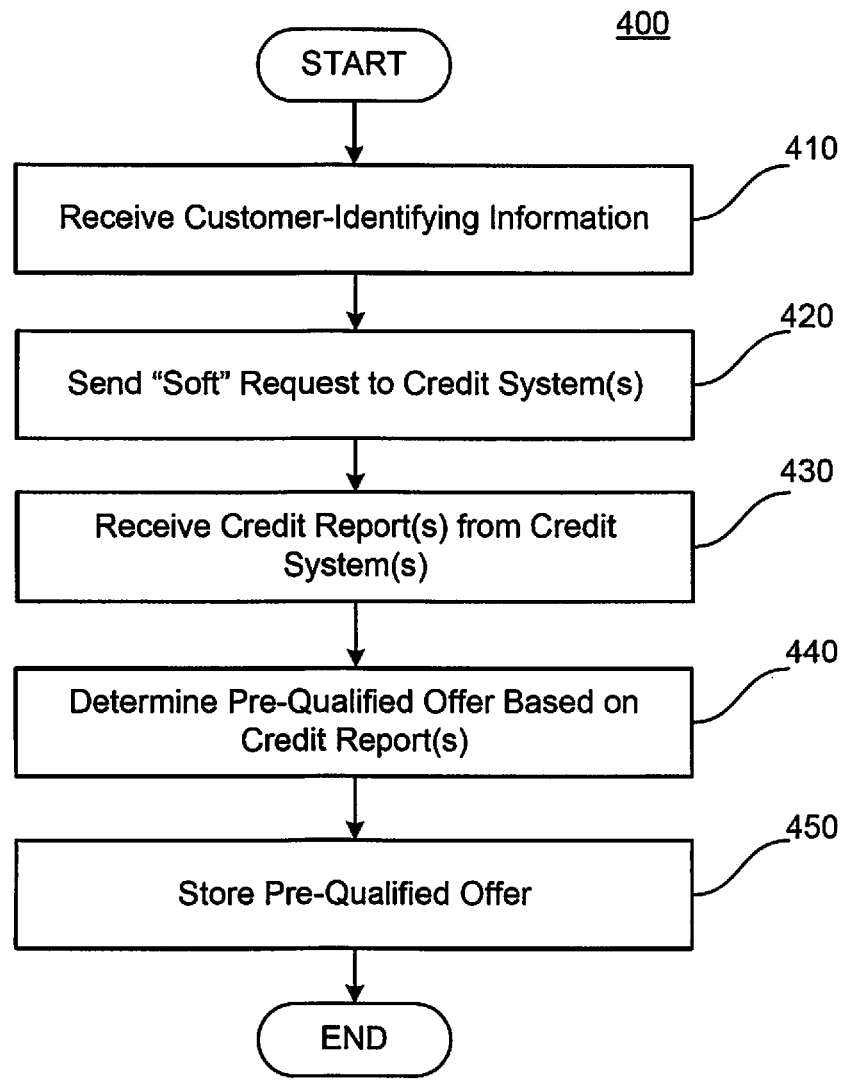
FIG. 4 is a flowchart of an exemplary pre-qualification determination process, consistent with disclosed embodiments.

FIG. 4 is a flowchart of an exemplary pre-qualification determination process 400, consistent with disclosed embodiments. In some embodiments, financial service system 110 may perform one or more of the steps of process 400 to determine or otherwise generate pre-approved offers associated with a submitted a pre-qualification application. In this way, process 400 may correspond to an exemplary embodiment of step 340 of process 300.

In certain aspects, process 400 may include steps that allow financial service system 110 to assess the risk, creditworthiness, etc. of a customer and make a loan offer based thereon, while maintaining the credit history status of a pre-qualification inquiry. In this way, financial service system 110 can apprise a customer of particular parameters of a potential loan that the customer could accept, without risking damage to the customer's credit history.

In step 410, financial service system 110 may receive customer-identifying information. For example, financial service system 110 may analyze a completed pre-qualification application for information that allows financial service system 110 to identify a customer seeking pre-qualification. For example, financial service system 110 may select information from the completed pre-qualification application that identifies the customer, such as name, address, social security number, driver's license number, phone number, account number, care number, pin number, etc. In some instances, financial service system 110 may use this information or a subset of this information to determine additional customer-identifying information.

In step 420, financial service system 110 may send a "soft" request to credit system(s) 130. For example, financial service system 110 may transmit customer-identifying information to one or more credit system(s) 130 as part of a "soft"

inquiry for credit history information (e.g., credit reports and/or credit scores). In an exemplary embodiment, the request may include information identifying the request as a "soft" inquiry. For example, the request may include, in addition to the customer identifying information, a unique code (e.g., a subscriber code unique to financial service provider 105 and/or the customer) that indicates that the request is part of a "soft" inquiry and is not a final loan application. The unique code may indicate that the request is part of a pre-qualification process, and thus, is not to have an effect on the customer's credit history.

In step 430, financial service system 110 may receive credit report(s) from credit system(s) 130. Financial service system 110 may receive the credit report(s) in response to the request sent to the credit system(s) 130 in step 420. The received credit reports may include any and all credit information that is stored by credit system(s) 130 and which may allow financial service system 110 to assess the risk and creditworthiness of the customer. That is, the credit reports may include all of the information that would be provided in response to a final loan application, even though the request sent to credit system(s) 140 was a "soft" request. In this way, financial service system 110 can rely on the information in the credit reports to the same degree as if it were credit report information provided in response to a final loan application.

In step 440, financial service system 110 may determine one or more pre-qualified offers based on the credit report(s). For example, financial service system 110 may use a credit policy and pricing program to assess the risk and/or creditworthiness of the customer, and determine the structure of a loan for which the customer is approved. For instance, financial service system 110 may determine a loan amount up to which the customer is qualified to receive, as well as an interest rate, or range of interest rates that would be associated with payback of the loan.

In some instances, financial service system 110 may determine more than one pre-qualified offers for which the customer is approved. For example, financial service system 110 may determine ranges of loan amounts and interest rates, or ranges of interest rates, that would be associated with loans that fall within each particular loan amount range.

In some embodiments, financial service system 110 may determine a pre-qualified offer in relation to one or more vehicles that the customer is considering purchasing. For example, financial service system 110 may use information related to the vehicles (e.g., vehicle retail sales prices) to determine a loan amount and interest rate for the pre-qualified offers for the purchase of those particular vehicles. For instance, financial service system 110 may receive information related to a first vehicle and information related to a second vehicle, in addition to receiving the customer-identifying information in step 410. Financial service provider system 110 may set a retail sales price of each of the vehicles to be the loan amount for a pre-qualified offer, and determine other parameters of the loan (e.g., interest rate, down payment, etc.), that would be necessary for the loan to be approved by financial service provider 105. In this way, the customer can directly compare financing for vehicles that they are considering purchasing.

In step 450, financial service system 110 may store the one or more pre-qualified offers. Financial service system 110 may store the pre-qualified offer(s) in a memory device in a manner associating the pre-qualified offer(s) with the customer to which the pre-qualified offer(s) apply. In some embodiments, financial service system 110 may store only a selected pre-qualified offer (e.g., a pre-qualified offer that was selected by the customer). Financial service system 110 may be configured to recall the pre-qualified offer at a later time, such as when the customer decides to accept the pre-qualified offer in order to receive financing for a vehicle purchase, as will be described in more detail below.

Through exemplary processes 300 and 400, financial service system 110 may determine one or more loan offers for a customer that represent offers that the customer can accept in order to receive financing for the purchase of a vehicle. In addition, the loan offers may be determined and provided as pre-qualified offers such that only a "soft" inquiry may need to be sent to credit system(s) 130. But because the "soft" inquiry results in financial service system 110 receiving enough information to satisfactorily assess the risk and creditworthiness of the customer, financial service provider 105 can commit to honoring the pre-qualified offers, should one or more of them be accepted by a customer.

Further, a customer may use the pre-qualified offers as a tool in the process of selecting a vehicle to purchase. For example, a customer can use a pre-qualified offer to determine a budget for the purchase of a vehicle, and select potential vehicles that fall within the budget. In another example, financial service system 110 may provide multiple pre-qualified offers, which may further allow the customer to consider the parameters of a loan that they would accept. In some instances, financial service system 110 may provide pre-qualified offers in relation to for sale vehicles, thus allowing the customer to understand the financing that is available for specific vehicles that they are considering purchasing, and use that information to select which vehicle to purchase.

Client device 120 may operate in conjunction with financial service system 110 in order to provide information to the customer and allow the customer to provide information to financial service system. For example, client device 120 may include interface hardware that displays user interfaces generated based on information from financial service system 110, allowing the customer to operate client device 120 to provide input that may be sent to financial service system 110.

Figure 5:
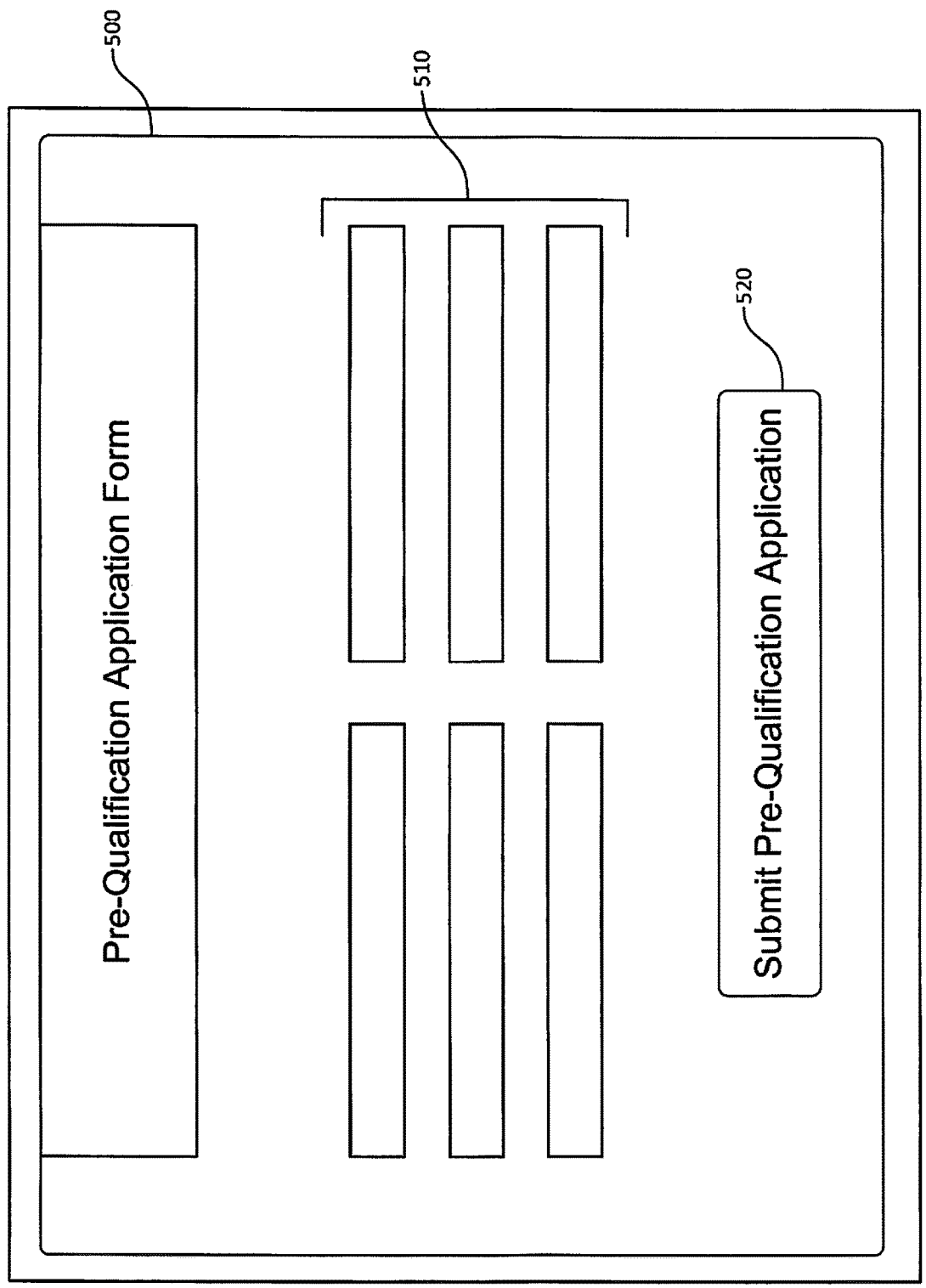
FIG. 5 is an illustration of an exemplary user interface including a pre-qualification application, consistent with disclosed embodiments.

FIG. 5 is an illustration of an exemplary user interface 500 that includes a pre-qualification application form, consistent with disclosed embodiments. Financial service system 110 may provide information that allows client device 120 to generate or otherwise display user interface 500. User interface 500 may include a plurality of fields 510. Fields 510 may be prompts for information from the customer. For example, fields 510 may include prompts for customer-identifying information, such as name, address, etc. Fields 510 may include prompts for other information, such as requested parameters of a loan, such as loan amount, interest rate, down payment, trade-in value, etc. In some instances, fields 510 may include prompts for information related to a vehicle that the customer is considering purchasing, which may include vehicle information (e.g., VIN number) and/or may include vehicle characteristics (e.g., vehicle make, model, year, mileage, color, features, etc.). The customer may operate client device 120 to provide input to answer one or more of the prompts, which client device 120 may transmit to financial service system 110. For example, user interface 500 may include a submit feature 520 that, when selected by the customer, causes client device 120 to transmit the input information to financial service system 110.

Figure 6:
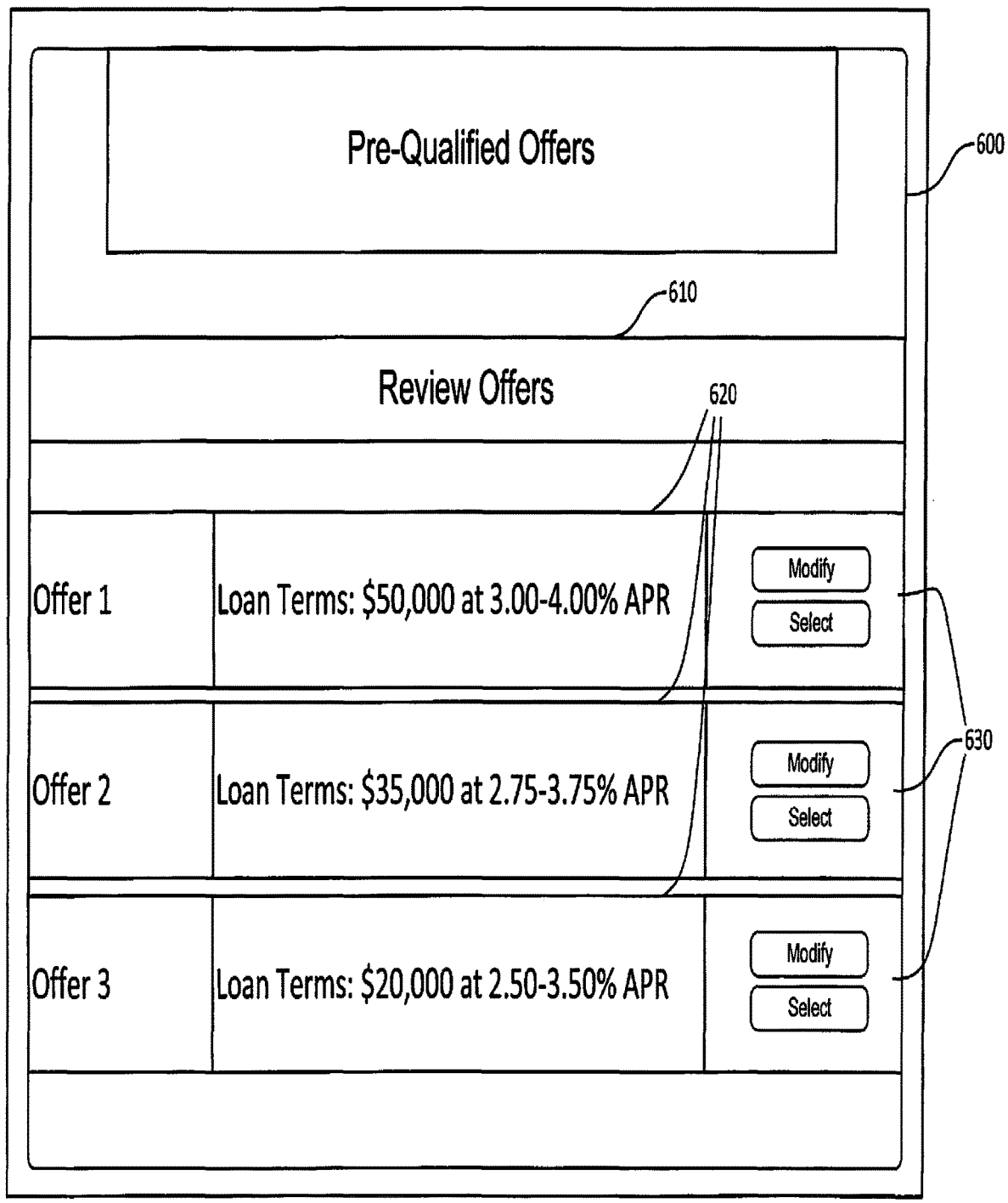
FIG. 6 is an illustration of an exemplary user interface including pre-qualified offers, consistent with disclosed embodiments.

FIG. 6 is an illustration of an exemplary user interface 600 that includes one or more pre-qualified offers, consistent with disclosed embodiments. Client device 120 may display user interface 600 in response to financial service system 110 sending the pre-qualified offers to client device 120 (e.g., after determining the pre-qualified offers based on information input based on user interface 500).

In an exemplary embodiment, User interface 600 may include a plurality of pre-qualified offers 610. Each pre-qualified offer 610 may include associated loan terms 620. As shown in FIG. 6, the loan terms may be different such that the customer can consider different options for financing a vehicle purchase. In some embodiments, user interface 600 may further include options 630 for allowing a customer to provide input in relation to one or more of the pre-qualified offers. For example, the customer may choose to modify a pre-qualified offer by providing a precise loan amount and/or vehicle sales price, such that additional terms of a loan may be determined (e.g., exact interest rate, down payment, etc.). In another example, the customer may choose to select one of the pre-qualified offers. For example, the customer may provide input to client device 120 to select a pre-qualified loan offer that they have chosen to accept. Client device 120 may transmit information indicative of the customer input to financial service system 110, such as to allow the customer to itemize and edit details and terms of a potential loan, and/or to indicate to financial service system 110 that a pre-qualified offer should be stored as potential loan terms that the customer may decide to accept.

As described herein, some disclosed embodiments may include financial service system 110 storing and/or accessing a listing of vehicles for sale in conjunction with providing pre-qualified offers. For example, financial service system 110 may maintain inventory listings for one or more automobile dealerships, including updated listings of vehicles for sale, along with details of those vehicles including retail sales prices and any other information associated with those vehicles. In this way, financial service system 110 may use the information related to vehicles in determining one or more pre-qualified offers, and may also provide the information to client device 120 in order to inform the customer of the vehicles that are for sale.

Figure 7:
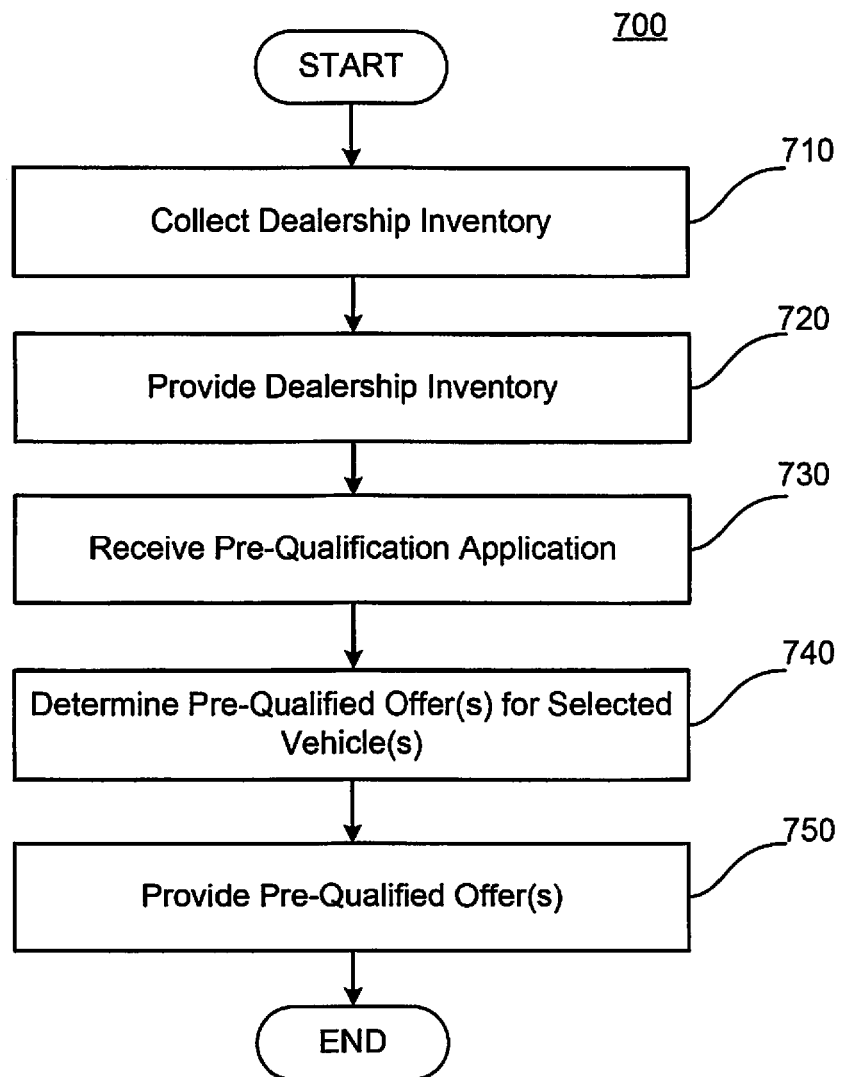
FIG. 7 is a flowchart of a selected-vehicle pre-qualification determination process, consistent with disclosed embodiments.

FIG. 7 is a flowchart of an exemplary selected-vehicle pre-qualification process 700, consistent with disclosed embodiments. In some embodiments, financial service system 110 may perform the steps of process 700 to provide one or more pre-qualified offers to client device 120 in conjunction with one or more vehicles for sale. In some embodiments, client device 120 may provide a selection of one or more vehicles to be considered in conjunction with a pre-qualification determination. In other embodiments, financial service system 110 may select the vehicles (e.g., based on other information provided by client device 120).

In step 710, financial service system 110 may collect dealership inventory. For example, financial service system 110 may communicate with one or more dealership system(s) 140 to maintain an updated list of vehicles for sale at one or more dealerships. Financial service system 110 may collect the vehicle inventory information, which may include information identifying the vehicles for sale (e.g., VIN, inventory number, make, model, year, etc.), and information identifying a value of the vehicle (e.g., retail sales price, discount price, estimated value, etc.).

In step 720, financial service system 110 may provide the dealership inventory. For example, financial service system 110 may provide the dealership inventory to client device 120. Client device 120 may display the dealership inventory through a user interface that the customer may view to view and search vehicles for sale. In some instances, the user interface may include information describing the vehicles, as well as other features and services, such as user reviews of vehicles and/or auto dealerships, vehicle history reports (e.g., CarFax® reports), estimated vehicle values (e.g., Kelley Blue Book™ values), tools associated with trade-in vehicles (e.g., value calculators, third-party purchasers, for sale listing services, etc.), and the like.

In step 730, financial service system 110 may receive a pre-qualification application. For example, client device 120 may send a completed pre-qualification application to financial service system 110. In an exemplary embodiment, the pre-qualification application may include customer-identifying information that allows financial service system 110 to determine one or more pre-qualified offers, as described in relation to processes 300 and 400. In addition, in some embodiments, the pre-qualification application may include a selection of one or more vehicles for sale that were provided to client device 120 as part of a vehicle inventory listing.

In step 740, financial service system 110 may determine one or more pre-qualified offers for selected vehicle(s). For example, financial service system 110 may perform one or more steps of process 400 to assess the risk and creditworthiness of a customer, but may also use a value of a selected vehicle in determining a pre-qualified offer that is specific to that vehicle. For instance, financial service system 110 may set a retail sales price of a vehicle to be a loan amount, and determine other details and terms of a pre-qualified offer for that vehicle based on the loan amount and the assessed risk and creditworthiness of the customer. In some embodiments, financial service system 110 may determine pre-qualified offers for a plurality of selected vehicles.

In step 750, financial service system 110 may provide the pre-qualified offer(s). For example, financial service system 110 may provide the pre-qualified offers to client device 120. Client device 120 may generate one or more user interfaces to display the pre-qualified offers.

It should be understood that one or more of the steps of process 700 may be omitted and/or rearranged depending on the manner in which vehicles are selected for use in conjunction with determining one or more pre-qualified offers. For example, in some instances, a pre-qualification application may be received prior to providing a dealership inventory to client device 120. Financial service system 110 thereafter may select vehicles for inclusion in the pre-qualified offer determinations based on other available information, such as information included in the pre-qualification application (e.g., desired vehicle sales price, vehicle characteristics, etc.). In another embodiment, financial service system 110 may automatically determine pre-qualified offers for all vehicles in a vehicle inventory and/or on demand as vehicle information is sent to client device 120. In general, it should be understood that financial service system 110 may determine a pre-qualified offer that pertains specifically to one or more for sale vehicles, and that information may be sent to client device 120 for display of the vehicle information and pre-qualified offer information in conjunction with each other.

Figure 8:
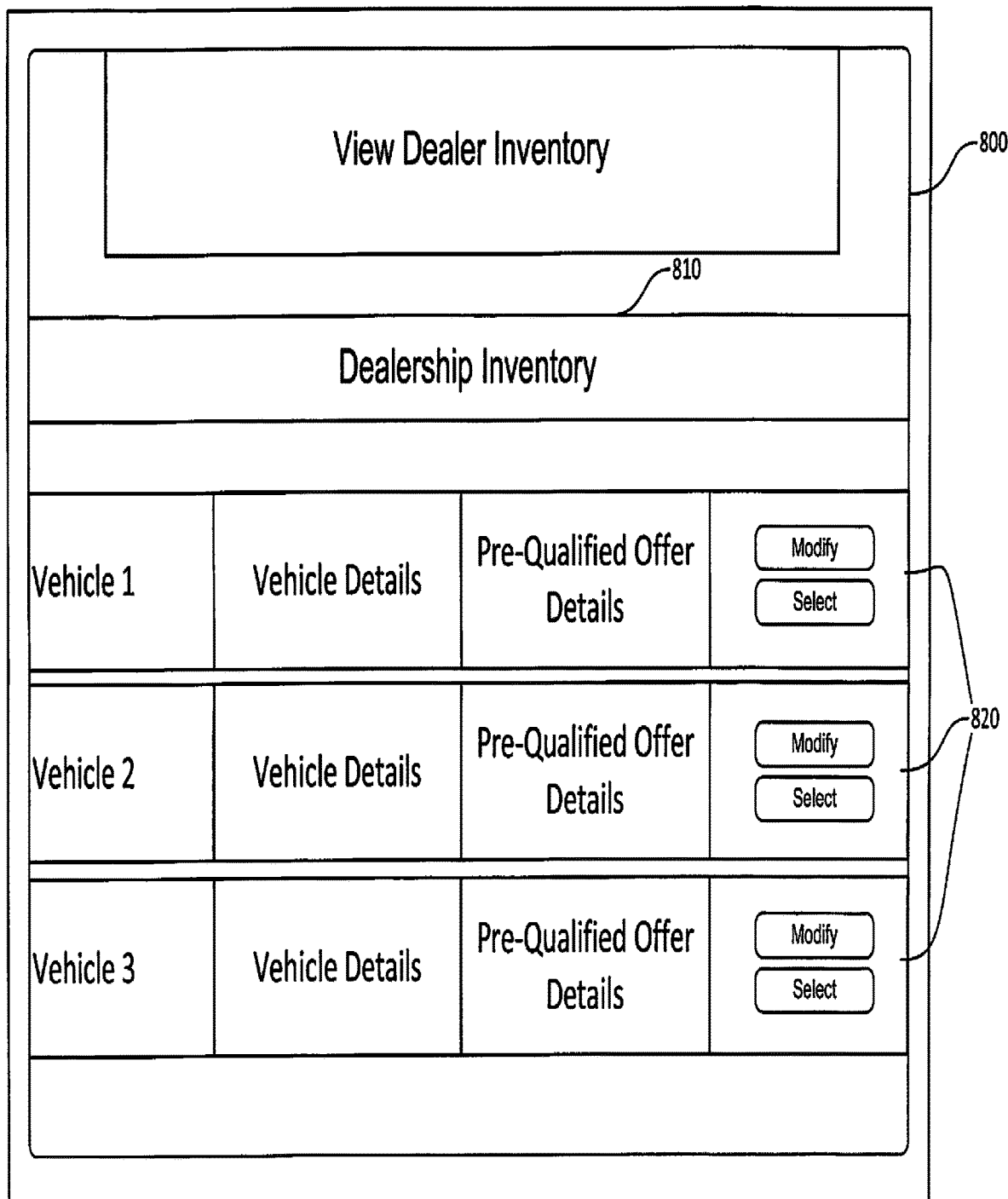
FIG. 8 is an illustration of exemplary user interface including pre-qualification offers in conjunction with a vehicle inventory listing, consistent with disclosed embodiments.

FIG. 8 is an illustration of an exemplary user interface 800 including dealership inventory vehicle information and pre-qualified offer information, consistent with disclosed embodiments. Client device 120 may generate and/or display user interface 800 using interface hardware based on information provided by financial service system 110.

In one embodiment, user interface 800 may include a dealership inventory listing 810. The dealership inventory listing 810 may include a listing of vehicle entries 820, which may represent vehicles for sale. In an exemplary embodiment, each entry 820 may include vehicle details, pre-qualified offer details, and options for the customer to provide further input regarding one or more of the entries 820.

Vehicle details may include information identifying characteristics of the associated vehicle, such as make, model, year, mileage, features, etc. Vehicle details may also include information such as sales price, estimated value, seller information, etc.

Pre-qualified offer details may include information identifying one or more parameters of a pre-qualified offer associated with the corresponding vehicle. For example, pre-qualified offer details may include one or more of a loan amount, interest rate or range of interest rates, down payment, trade-in value, length of loan term, monthly payments, etc. The pre-qualified offer details may pertain to the corresponding vehicle in that the pre-qualified offer may be accepted by the customer and used to purchase that vehicle.

Input options may include options for a customer to modify the terms of a pre-qualified offer. For example, the customer may provide a negotiated price of the vehicle (which may be different than the retail sales price), a down payment amount, trade-in value amount, etc. Input options may additionally or alternatively include an option for a user to select a listed vehicle. This option may allow a user to mark a particular vehicle as a potential offer that the customer may accept, may indicate that the customer is accepting the offer, and/or may allow a customer to complete additional steps toward the purchase of the vehicle (e.g., provide additional information, complete a purchase, complete a financing agreement, etc.).

Client device 120 may receive input information and send the information to financial service system 110 for further processing. For example, financial service system 110 may determine a revised pre-qualified offer based on additional information received through the "modify" input option. In another example, financial service system may store a selected vehicle and pre-qualified offer, such as for use in allowing the customer to accept the offer.

Further, it should be understood that other input options may be provided for allowing a customer to provide input and otherwise interact with user interface 800. For example, user interface 800 may include filter and search options for allowing the customer to refine a vehicle search. In another example, user interface 800 may include third-party service options, such as user reviews of vehicles and/or auto dealerships, vehicle history reports (e.g., CarFax® reports), estimated vehicle values (e.g., Kelley Blue Book™ values), tools associated with trade-in vehicles (e.g., value calculators, third-party purchasers, for sale listing services, etc.), and the like.

Through exemplary processes 300, 400, and 700, and user interfaces such as exemplary user interfaces 500, 600, and 800, financial service provider system 110 may provide client device 120 with one or more pre-qualified offers that are binding offers a customer may rely on to finance the purchase of a vehicle. These processes and user interfaces may be configured in a manner that provides a comprehensive vehicle purchasing tool that allows the customer to view vehicles for sale and financing options in one place. The disclosed embodiments provide a customer with efficient access to pertinent information that helps the customer through the otherwise complicated and tedious process of selecting a vehicle to purchase. Once a vehicle is selected, additional processes may be performed in order to allow the customer to receive selected financing and actually purchase the vehicle.

Figure 9:
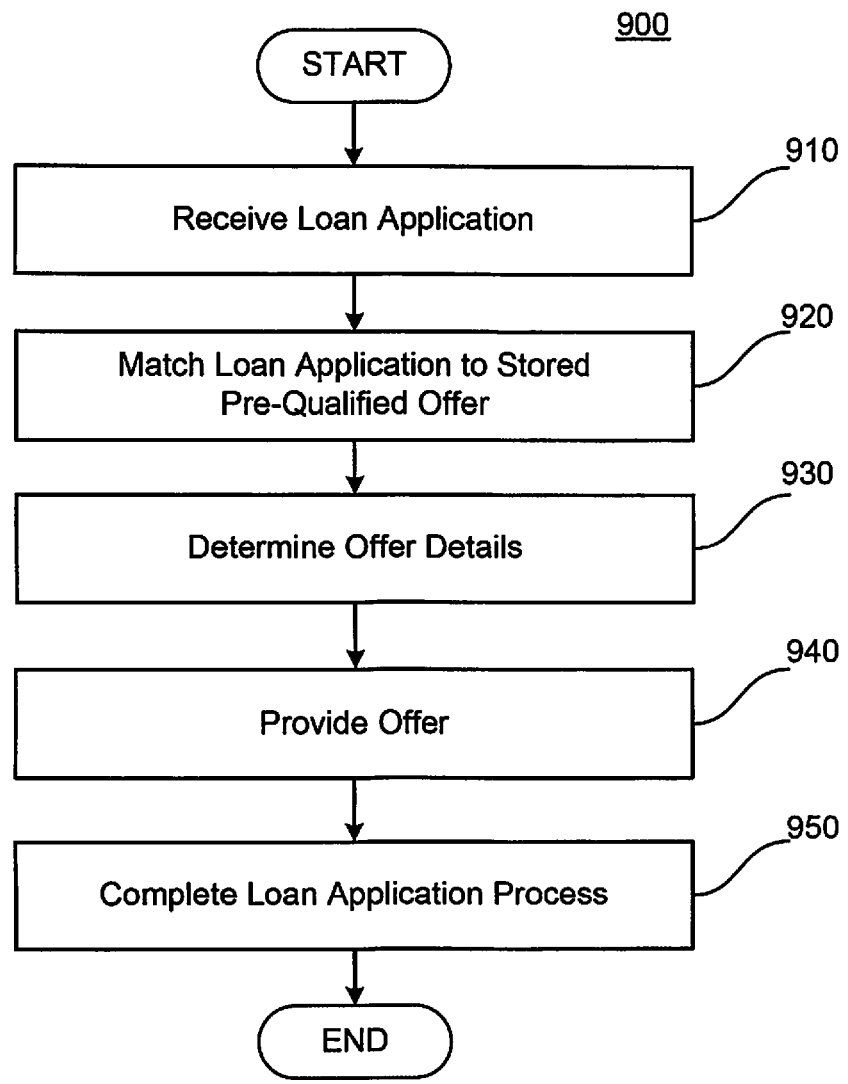
FIG. 9 is a flowchart of an exemplary loan application process, consistent with disclosed embodiments.

FIG. 9 is a flowchart of an exemplary loan application process 900. Financial service system 110 may perform one or more steps of process 900 to enable a customer to accept a pre-qualified offer and complete a loan agreement to receive the associated financing.

In some instances, process 900 may occur in the context of a customer agreeing to the purchase of a vehicle with a dealership at a dealership location and a dealership employee operating a dealership system 140 to compete the financing process. In other instances, process 900 may occur in the context of a customer completing the financing process using client device 120.

In step 910, financial service system 110 may receive a loan application. For example, financial service system 110 may receive a loan application from dealership system 140. The loan application may be a typical application for financing that may be submitted for the purpose of applying for financing. For instance, the loan application may be a loan application that a customer would fill out and a dealership system 140 would send to financial service system 110 to determine whether the customer is approved for financing and, if so, the terms or range of terms for the financing. In process 900, however, the loan application may indicate that the customer is accepting a pre-qualified offer and is seeking to complete the financing process.

In step 920, financial service system 110 may match the received loan application to a stored pre-qualified offer. For example, the loan application may include an identifier that matches an identifier stored in association with one or more pre-qualified offers that were previously determined in relation to the customer. Financial service system 110 may additionally or alternatively match customer-identifying information and/or vehicle identifying information in the loan application to information stored as a pre-qualified offer. In this way, financial service system 110 may identify a pre-qualified offer, previously provided to client device 120, that is now being accepted by the customer.

In step 930, financial service system 110 may determine loan offer details. For example, financial service system 110 may recall the terms of the pre-qualified offer for use as terms of the loan. In addition, financial service system 110 may determine additional terms of the loan. For example, financial service system 110 may determine loan terms based on new information that was not previously provided. For instance, financial service system may select an interest rate from a range of previously-provided interest rates, based on a final amount of the loan. In order to honor the pre-qualified offer, at least one of the terms of the loan offer may match all of the corresponding terms of the pre-qualified offer.

In step 940, financial service system 110 may provide the loan offer. For example, financial service system 110 may provide the loan offer to dealership system 140. The loan offer may represent a final loan offer that may be accepted by the customer. But because the loan offer honors the corresponding pre-qualified offer, the loan offer may substantively allow the customer to officially accept the pre-qualified loan offer.

In step 950, financial service system 110 may complete the loan application process. For example, financial service system 110 may receive an indication that the customer accepts the loan offer (e.g., from dealership system 140). Financial service system 110 may thereafter perform conventional processes to provide the agreed-upon financing to the customer and thereby allow the customer to complete a vehicle purchase transaction.

Figure 10:
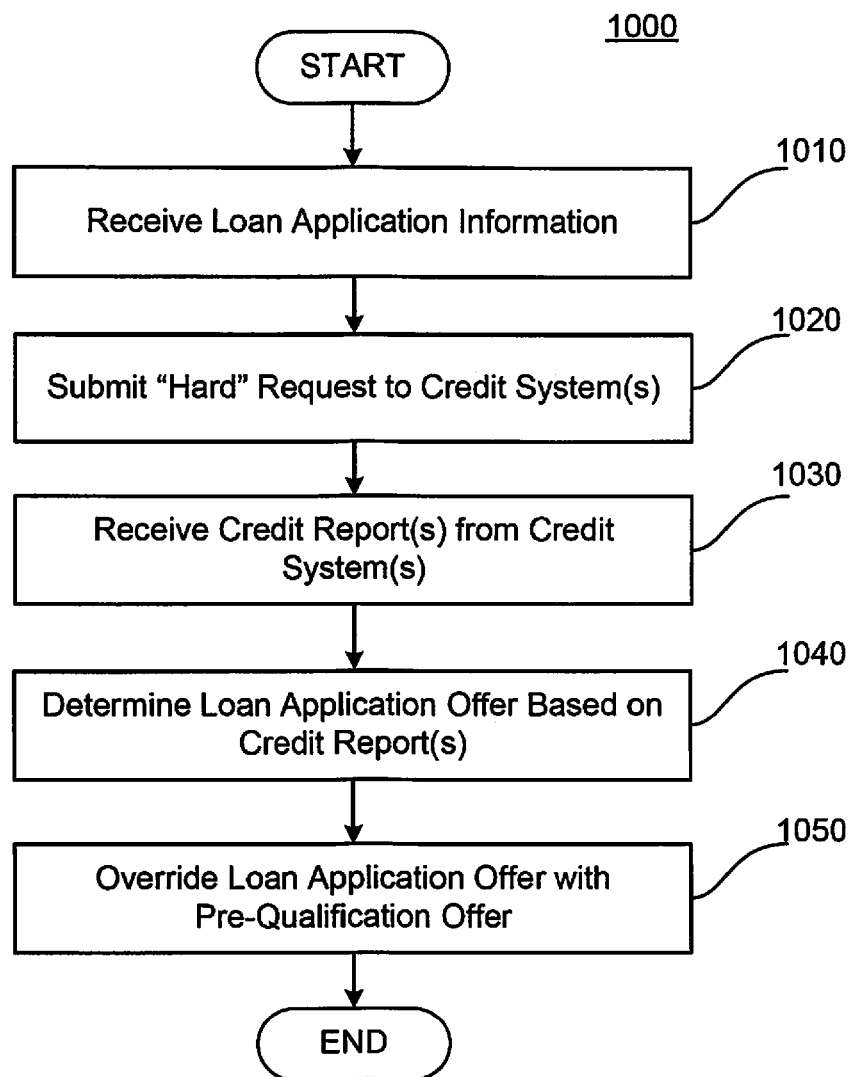
FIG. 10 is a flowchart of an exemplary pre-qualified offer acceptance process, consistent with disclosed embodiments.

FIG. 10 is a flowchart of an exemplary pre-qualified offer acceptance process 1000, consistent with disclosed embodiments. In certain aspects, process 1000 may correspond to step 930 of process 900. For example, financial service system 110 may perform process 900 to determine final details of a loan offer that may be accepted by a customer to cause financial service system 110 to complete the financing process.

In step 1010, financial service system 110 may receive loan application information. For example, financial service system 110 may identify information from a loan application received in step 910 of process 900. The loan application information may include any and all information typically included in a conventional loan application. For example, the loan application information may include customer-identifying information and vehicle-identifying information.

In step 1020, financial service system 110 may submit a "hard" request to credit system(s) 130. The "hard" request may be a "hard" inquiry for credit history information, such as might become reflected in credit reports and credit scores. Thus, the "hard" inquiry may be a conventional loan application inquiry, in that it may affect the customer's credit history. The credit system(s) 130 may receive the request and identify the credit report information associated with the customer.

In step 1030, financial service system 110 may receive credit report(s) from credit system(s) 130. Financial service system 110 may receive the credit report(s) in response to the request sent to the credit system(s) 130 in step 1020. The received credit reports may include any and all credit information that is stored by credit system(s) 130 and/or that may allow financial service system 110 to assess the risk and creditworthiness of the customer.

In step 1040, financial service system 110 may determine a loan application offer based on the received credit report(s). For example, financial service system 110 may use a credit policy and pricing program to determine the terms of a potential loan offer associated with the received loan application.

In step 1050, financial service system 110 may override the terms of the potential loan offer with the terms an associated pre-qualified offer. For example, financial service system 110 may replace any differing terms of the potential loan offer with corresponding terms of the pre-qualified offer, if there are any differing terms.

Through exemplary processes 900 and 1000, financial service system 110 may follow typical protocol to allow a customer to apply for a loan through existing channels. In addition, these exemplary processes allow financial service provider 105 to honor the terms of a pre-qualified offer, thus allowing the customer to rely on the pre-qualified offer during the process of selecting a vehicle to purchase.

As discussed above, it should be understood that the disclosed embodiments may be applied to different types of sales. Any financial service institution that provides loan accounts to customers may employ systems, methods, and articles of manufacture consistent with certain principles related to the disclosed embodiments. In addition, any buyer or seller of any articles of manufacture may also employ systems, methods, and articles of manufacture consistent with certain disclosed embodiments.

Computer programs based on the written description and methods of this specification are within the skill of a software developer. The various programs or program modules can be created using a variety of programming techniques. For example, program sections or program modules can be designed in or by means of Java, C, C++, assembly language, or any such programming languages. One or more of such software sections or modules can be integrated into a computer system, computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A method, performed by a computing system comprising one or more hardware processors and communicatively connected to a client device of a user, the method comprising the following steps:

providing instructions, to the client device, for an interface to display inventory information associated with at least one dealership system;

receiving, by the computing system, from the client device and over a network, a pre-qualification application, the pre-qualification application including customer-identifying information and a selection of at least one vehicle from the inventory information;

identifying, by the computing system, vehicle information for the selected at least one vehicle listed in the inventory information;

determining, by the computing system, a pre-qualification offer based at least on the customer-identifying information, the vehicle information, and a soft credit inquiry, the pre-qualification offer including a first loan term;

providing, to the client device, the first loan term for display on the interface as part of the pre-qualification offer in conjunction with the selected at least one vehicle;

receiving, by the computing system, a loan application associated with the user and the selected at least one vehicle, the loan application including an identifier;

accessing, by the computing system, a credit report of the user, the credit report received in response to a hard credit check;

determining, based on the identifier, whether the pre-qualification offer is a match to the completed loan application;

in response to a determination that the pre-qualification offer is a match to the completed loan application, designating, after accessing the credit report, the pre-qualification offer as a purchase loan offer for the received completed loan application, the purchase loan offer including the corresponding terms of the pre-qualification offer; and providing, by the computing system, the purchase loan offer to the client device for display.

2. The method of claim 1, further comprising:

generating a pre-qualification offer is generated for each of a plurality of vehicles listed in the inventory information; and sending to the client device for display with the respective vehicles.

3. The method of claim 2, further comprising:
sending an advertisement from the computing system to the client device; and
receiving, from the client device, a request for the pre-qualification application based on the received advertisement.

4. The method of claim 1, wherein the first loan term comprises one of a maximum amount for the loan, an interest rate, an APR, a range of interest rates, a length of loan term, monthly payments, minimum down payments, or trade-in value.

5. The method of claim 1, wherein the client device comprises one of a desktop computer, a laptop, a server, a mobile device, an embedded system, or a dedicated hardware system.

6. The method of claim 1, wherein the customer-identifying information comprises a financial account held by the user.

7. The method of claim 1, further comprising:
providing instructions, to the client device, for displaying the pre-qualification application on the client device, the pre-qualification application comprising a plurality of fields for receiving the customer-identifying information.

8. The method of claim 7, wherein the fields comprise prompts to receive vehicle information relating to a vehicle including at least one of a Vehicle Identification Number or vehicle characteristics.

9. The method of claim 1, wherein the customer-identifying information comprises at least one of a name, an address, a social security number, a driver's license number, a phone number, an account number, a card number, or a pin number.

10. The method of claim 1, wherein the inventory information comprises at least one of a vehicle description, a user review of a vehicle, a user review of a dealership, a vehicle history report, an estimated vehicle value, or a tool associated with trade-in vehicles.

11. A method, performed by a computing system comprising one or more hardware processors and communicatively connected to a client device of a user, the method comprising the following steps:
providing instructions, to the client device, for an interface to display inventory information associated with at least one dealership system;
identifying, by the computing system, vehicle information for at least one vehicle listed in the inventory information;
determining, by the computing system, a pre-qualification offer for the at least one vehicle based on at least one of customer-identifying information, the respective vehicle information, or an initial level of risk of the user, the pre-qualification offer including a first loan term;
providing, to the client device, the first loan term for display on the interface as part of the pre-qualification offer in conjunction with the at least one vehicle;
receiving, by the computing system, a completed loan application associated with the user and for the at least one vehicle, the completed loan application including an identifier;
determining, by the computing system, an additional level of risk of the user;
determining, based on the identifier, whether the pre-qualification offer is a match to the completed loan application;
in response to a determination that the pre-qualification offer is a match to the completed loan application, designating, after determining the additional level of risk, the pre-qualification offer as a purchase loan offer for the received completed loan application, the purchase loan offer including the corresponding terms of the pre-qualification offer; and
providing, by the computing system, the purchase loan offer to the client device for display.

12. The method of claim 11, further comprising:
generating a pre-qualification offer for each of a plurality of vehicles listed in the inventory information; and
sending to the client device for display with the respective vehicles.

13. The method of claim 11, wherein the first loan term comprises one of a maximum amount for the loan, an interest rate, an APR, a range of interest rates, a length of loan term, monthly payments, minimum down payments, or trade-in value.

14. The method of claim 11, wherein the client device comprises one of a desktop computer, a laptop, a server, a mobile device, an embedded system, or a dedicated hardware system.

15. The method of claim 11, wherein determining the initial level of risk comprises determining the initial level of risk is determined based on:
a soft credit inquiry: and
a credit report of the user in response to a hard credit inquiry.

16. The method of claim 11, wherein the customer identifying-information comprises a financial account held by the user.

17. The method of claim 11, further comprising:
providing instructions, to the client device, for displaying a pre-qualification application on the client device, the pre-qualification application comprising a plurality of fields for receiving the customer-identifying information.

18. The method of claim 17, wherein the fields comprise prompts to receive vehicle information relating to a vehicle including at least one of a Vehicle Identification Number or vehicle characteristics.

19. The method of claim 11, wherein the inventory information comprises at least one of a vehicle description, a user review of a vehicle, a user review of a dealership, a vehicle history report, an estimated vehicle value, or a tool associated with trade-in vehicles.

20. A method, performed by a computing system comprising one or more hardware processors and communicatively connected to a first client device of a user and a second client device, the method comprising the following steps:
providing instructions, to the first client device, for an interface to display inventory information associated with at least one dealership system;
receiving, by the computing system, from the first client device and over a network, a pre-qualification application, the pre-qualification application including customer-identifying information;
identifying, by the computing system, vehicle information for at least one vehicle listed in the inventory information;
determining, by the computing system, a pre-qualification offer based at least on the customer-identifying information, the vehicle information for the at least one vehicle, and a soft credit inquiry, the pre-qualification offer including a first loan term;

providing, to the first client device, the first loan term for display on the interface as part of the pre-qualification offer for the at least one vehicle in conjunction with the at least one vehicle;

receiving, by the computing system, from the first client device, a user request to modify the first loan term;

determining, by the computing system, a modified pre-qualified offer based on the user request, the modified pre-qualified offer comprising a modified loan term;

providing, by the computing system, the modified pre-qualified offer to the first client device;

receiving, by the computing system, a completed loan application associated with the user and the at least one vehicle, the loan application including an identifier;

accessing, by the computing system, a credit report of the user, the credit report received in response to a hard credit check;

determining, based on the identifier, whether the pre-qualification offer is a match to the completed loan application;

in response to a determination that the pre-qualification offer is a match to the completed loan application, designating, after accessing the credit report of the user, the pre-qualification offer as a purchase loan offer for the received completed loan application, the purchase loan offer including the corresponding terms of the pre-qualification offer; and providing, by the computing system, the purchase loan offer to a second client device for display.

* * * * *